US006748423B1

(12) United States Patent
Khanna et al.

(10) Patent No.: US 6,748,423 B1
(45) Date of Patent: Jun. 8, 2004

(54) REMOTE CONTROL OF A LINKED COMPUTER

(75) Inventors: Rahul Khanna, Beaverton, OR (US); Kerry B. Vander Kamp, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/513,008

(22) Filed: Feb. 25, 2000

(51) Int. Cl.[7] .................. G06F 15/16; G06F 15/177; G06F 9/00; G06F 9/24; G06F 9/445; H04N 7/173

(52) U.S. Cl. .................. 709/210; 709/208; 709/232; 713/1; 713/2; 725/105; 725/113; 725/116; 725/120

(58) Field of Search .................. 709/208, 210, 709/211, 232; 725/105, 107–117, 120, 127, 132–134; 713/1, 2, 100

(56) References Cited

U.S. PATENT DOCUMENTS

| | | | | |
|---|---|---|---|---|
| 4,648,123 A | * | 3/1987 | Schrock | 455/67.4 |
| 5,978,912 A | * | 11/1999 | Rakavy et al. | 713/2 |
| 6,009,520 A | * | 12/1999 | Gharda | 713/1 |
| 6,137,473 A | * | 10/2000 | Cortopassi et al. | 345/156 |
| 6,249,863 B1 | * | 6/2001 | Redford et al. | 713/1 |
| 6,279,153 B1 | * | 8/2001 | Bi et al. | 717/171 |
| 6,282,643 B1 | * | 8/2001 | Cromer et al. | 713/2 |
| 6,317,885 B1 | * | 11/2001 | Fries | 725/109 |
| 6,324,644 B1 | * | 11/2001 | Rakavy et al. | 713/1 |
| 6,373,498 B1 | * | 4/2002 | Abgrall | 345/619 |
| 6,389,464 B1 | * | 5/2002 | Krishnamurthy et al. | 709/220 |
| 6,411,616 B1 | * | 6/2002 | Donahue et al. | 370/352 |
| 6,477,642 B1 | * | 11/2002 | Lupo | 713/2 |
| 6,487,362 B1 | * | 11/2002 | Yuen et al. | 386/83 |
| 6,487,656 B1 | * | 11/2002 | Kim et al. | 713/2 |
| 6,523,111 B1 | * | 2/2003 | Smolski | 713/2 |

OTHER PUBLICATIONS

Cahn, Robert S. "ASCII Protocol Conversion Revisited" IEEE Journal on Selected Areas on Communications, vol. 8, No. 1, Jan. 1990. pp. 93–98.*

* cited by examiner

Primary Examiner—Rupal Dharia
Assistant Examiner—Melvin H. Pollack
(74) Attorney, Agent, or Firm—Fish & Richardson P.C.

(57) ABSTRACT

Techniques for using a controlling computer to control another computer with special instruction package prior to launch of the operating system in the controlled computer. For example, a method includes operating the package prior to running the OS in the controlled computer, using the package to cause the controlled computer to respond to a command from the controlling computer, using the package to generate a video frame to represent the received command and the generated response in two separate fields, and sending data for the video frame to the controlling computer. The package may be a special BIOS instruction set. The two separate fields have different coordinates and data bits representing the command are in the designated command field. In operation, the special BIOS set extracts a command from the data bits in the designated command field for execution according to the coordinates of the data bits.

19 Claims, 6 Drawing Sheets

REMOTE CONTROL OF A LINKED COMPUTER

BACKGROUND

This disclosure generally relates to communication among linked computers, and more specifically, to access and control of one computer by a remote computer.

An information processing device, such as a computer, can be linked to one or more other information processing devices, such as other computers, to exchange data or other information. A communication link between two linked computers may be wired links such as electrical cables and optic fibers, wireless links by radio or optical waves, or a combination of both. Often such a link is established through one or more communication networks.

One computer may be used to control certain aspects of another linked computer. For example, a client computer can send an executable command to a server and receive the status of the server or the result of the execution performed by the server. Such remote control can be used to maintain and update a server and to manage a computer network.

DETAILED DESCRIPTION

Many computers include a basic input and output system ("BIOS"), i.e., a set of operating routines or instructions that control communication between different devices within a computer. One function of the BIOS, among others, is to check the status of these devices and to perform a power on self test "POST") before the launch and operation of an operating system. During the POST, the BIOS initializes and establishes communication of the devices connected to a system bus. The systems and techniques of the present disclosure include a set of special BIOS routines to form a BIOS console in a computer that can execute certain operations in absence of a running operating system and can communicate with a linked remote computer. A user can use the communication between the BIOS console and the linked remote computer to control and manage the computer from a remote location.

This BIOS console can be designed to communicate with a linked remote computer to receive and execute commands and to send corresponding execution results back to the linked remote computer. The data from the BIOS console to the linked remote computer may include the video data to inform a user at the linked remote computer on the status of the computer that is running the BIOS console.

The commands from the linked remote computer and the data from the BIOS console may be formatted in a commonly accepted video data format so that they can be transmitted between the computers as regular video frames. Hence, the communication of the control commands and execution results between the computers can be achieved by using the existing video hardware and software in the computers and based on any suitable communication protocols such as terminal emulators. The video data format may be compatible with different computer platforms or different software applications.

Each video frame is partitioned to have a designated command field where data bits for a command are placed, and a separate designated result field where data bits for the output of the BIOS console in response to the command are placed. Each data position in the video frame is uniquely represented by a data coordinate. Since the command field and the result field in the video frame are separated, the data coordinates for the command and the data positions for the result are distinctly different. The BIOS console can be designed to process such a video frame based on the data coordinates to identify and parse the data bits for the command and the data bits for the result so that the BIOS console can extract the command sent from the remote computer and execute the command. The BIOS console can then place the result of the execution into the result field of a video frame and send the video frame to the remote computer.

The remote computer has a BIOS console intelligence software module that can process the video frame by parsing data bits in the command field and data bits in the result field. Hence, the data bits for the execution result can be processed by the BIOS console intelligence module into a form that a user can understand. In addition, the BIOS console intelligence module places data bits for a command input from the user in the designated command field of an output video frame so that the BIOS console in another computer can recognize and execute the command.

When a computer configured with this BIOS console fails to boot its operating system due to an error, the BIOS console on the failed computer can be initiated. That allows another linked remote computer to detect the status of the failed computer and to execute certain commands in the failed computer to correct the error. The computer configured with this BIOS console is operating normally under an operating system, a user can still use the linked remote computer to command the computer to launch the BIOS console upon a subsequent reboot by using a BIOS flag. Hence, during the next reboot, the BIOS flag prompts the BIOS console to initialize. This allows the linked remote computer to execute certain operations on the computer through the BIOS console, e.g., changing a device parameter therein, before launching the operating system.

Figure 1:
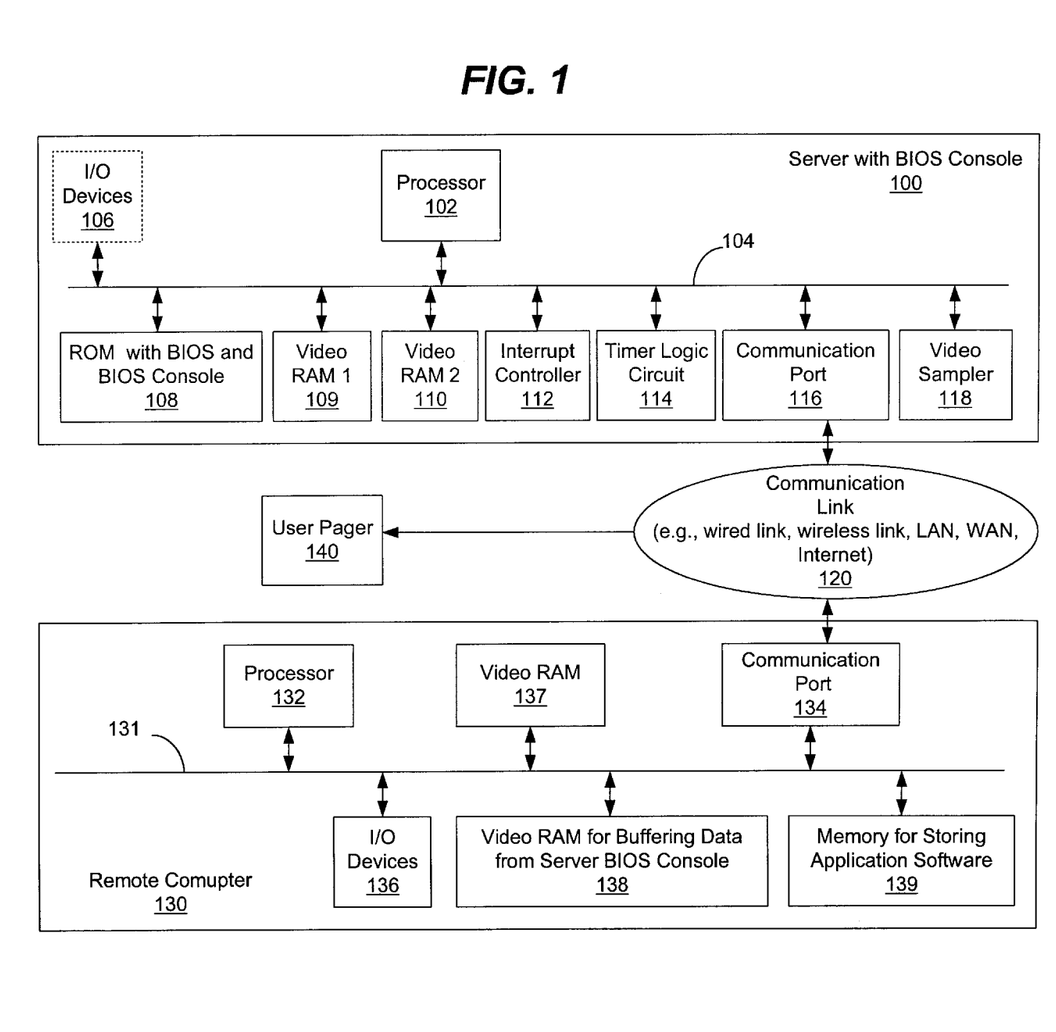
FIG. 1 shows one embodiment of a computer system that allows a pre-boot control from a remote computer.

FIG. 1 shows an exemplary hardware configuration of a computer server 100 with the BIOS console. The server 100 is shown to connect to a remote computer 130 via a communication link 120. The link 120 may be wired or wireless, or a combination of both, and may be a direct link such as a serial connection, or a link through a communication network such as a cable network, a telephone network, LAN, WAN, and the Internet. The remote computer 130 may be a portable computer, a desktop PC, a workstation, or any other information processing device based on a computer processor. The server 100 may also send out a paging signal through the link 120 or an independent link to a user pager 140 to inform a user of its status.

The server 100 in this embodiment includes a processor 102 (e.g., an Intel processor), a system bus 104, and one or more communication ports 116. The system bus 104 connects different computer devices within the server 100, such as I/O devices 106 (e.g., keyboard and monitor), a read-only memory "ROM") 108, two video random-access memory "RAM") units 109 and 110, an interrupt controller 112, a timer logic circuit 114, and a video sampler 118. The BIOS of the server 100 and the special BIOS routines for the BIOS console are stored in the ROM 108. The operating system for the server 100 may be installed locally in a memory device, usually a hard drive, within the server 100, or alternatively in a remote device connected to the server 100.

The first video RAM 109 can be either the main video memory on the video board of the server 100 or a virtual video RAM if the server 100 does not have a video board. The virtual video RAM can be formed by a designated RAM or a virtual RAM designated within a hard drive, a floppy drive, or other memory devices in the server 100. However formed, the first video RAM 109 is to temporarily store a video frame from the remote computer 130 and a video frame newly generated by the BIOS console to be sent to the remote computer 130. The second video RAM 110 is designated as a local BIOS console buffer to store the last video frame that is sent to the remote computer 130 by the BIOS console. Hence, when the BIOS console outputs a new video frame to the first video RAM 109 which is to be sent to the remote computer 130, a previous video frame from the BIOS console is still retained in the second video RAM 110. The data in the RAM 110 is overwritten by a video frame from the RAM 109 that is just sent to the remote when a new video frame is generated.

The BIOS console can be designed to include a mechanism to compare the two different video frames in the video RAMs 109 and 110 to determine whether the new video frame in the video RAM 109 is different from the old video frame in the RAM 110. In one implementation, the BIOS console sends only the data bits that are changed from the previous video frame to the remote computer 130. This can reduce the amount of data to be transmitted and hence can increase the operating speed of the BIOS console.

The frame comparison mechanism may be implemented in two different ways. One is to use the video sampler circuit 118 to compare two different frames of data. If the newly generated frame of data is the same as a previous frame of data, the BIOS console will not send that new video frame from the server 100 to the remote computer 130. If, however, certain data bits of a newly generated BIOS console frame are different from a previous frame, the BIOS console will send each different data bit from the server 100 to the server 130. Alternatively, the video sampler 118 may be eliminated and its function of comparing two frames can be implemented by a software module as part of the BIOS console routines in the ROM 108.

The BIOS console may be configured to operate based on a timer interrupt service routine "ISR"). The interrupt controller 112 periodically generates this timer ISR at periodic timer ticks of a clock signal produced by the timer logic circuit 114. The BIOS console in the ROM 108 may be set to execute an operation only at a timer ISR. Hence, the frequency of this clock signal from the timer logic circuit 114 partially determines the speed at which the BIOS console operates. The time delay for data transmission in the link 120 between the server 100 and the remote computer 130 also affects the operating speed of the BIOS console. In operation, the interrupt controller 112 can indicate a timer interrupt to the processor 102. The processor 102 then looks at a timer interrupt address to execute a routine or instruction of the BIOS console.

In certain applications, the I/O devices 106 of the server 100 may be eliminated so that a user can only access and control the server 100 through its communication port 116. A security feature may be implemented in the BIOS console of the server 100 to permit access by only authorized users. This may be achieved by, for example, granting access based on a valid password.

The remote computer 130 as shown includes, among others, a processor 132, a system bus 131, I/O devices 136, video RAMs 137 and 138, and a memory unit 139 for installing its operating system, application software, and the BIOS console intelligence module for processing each BIOS console video frame. A communication port 134 connects the remote computer 130 to the communication link 120 and hence the server 100 to receive and send the BIOS console video frames.

The video RAM 137 is the main video RAM for the remote computer 130 to directly receive a BIOS console video frame from the server 100 and to store a video frame with a new command to be transmitted to the server 100. The video RAM 138 copies the video frame from the server 100 in the RAM 137 so that the BIOS console intelligence module can process the BIOS console video frame to produce a user-understandable textual or graphical representation of the output of the BIOS console in the server 100 that is produced in response to a command from the remote computer 130.

Figure 2:
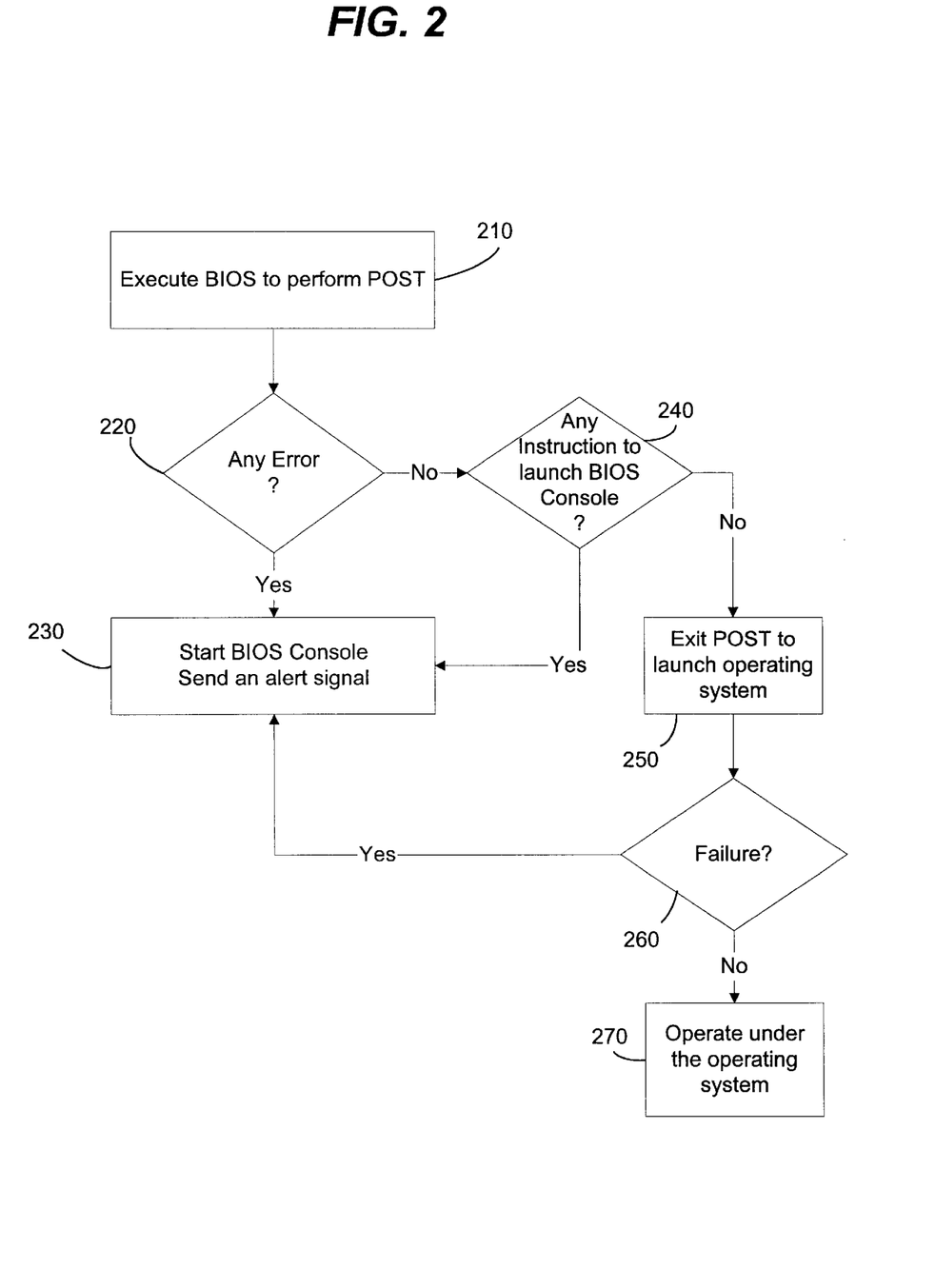
FIG. 2 shows one embodiment of a workflow for initializing a BIOS console.

FIG. 2 illustrates how the server 100 initializes its BIOS console by either a failure of the operating system or a request by a user from a remote computer. At step 210, the power is turned on to boot the server 100. The processor 102 executes a set of BIOS instructions in the ROM 108 to perform the POST. Various devices in the server 100 are initialized and tested, including the timer logic circuit 114, the interrupt controller 114, the communication port 116 and others. If the video sampler 118 is implemented, the BIOS also initializes the video sampler 118. If an error occurs during the initialization of various devices(step 220), a BIOS instruction is executed at step 230 to start the BIOS console.

The BIOS in the server 100 may also be configured to check whether there is an instruction to start the BIOS console before launching the operating system after the initialization is successfully completed. This is shown at Step 240. Such an instruction may be created as a BIOS flag from a remote computer in a previous operation of the server 100 in its operating system. In absence of such an instruction, the BIOS prompts the processor 102 to exit the POST and to launch the operating system (steps 250 and 270). If there is a failure in launching the operating system (step 260), the BIOS console is also initialized so that the failure may be determined or fixed by a user through the remote computer 130.

When the BIOS console is initialized, an alert signal is generated and sent out through the communication port 116 to either a pager 140, a remote computer (e.g., the computer 130), or any other information receiving device (e.g., a telephone). This alert signal may include an identification number associated with the server 100 so that a user can use a computer, or a computer can automatically respond to the alert signal, to access the server through its communication port 116 via the link 120 to operate the BIOS console in the server 100. This identification number of the server 100 may be a telephone number, a MAC address, or an IP address.

Each video frame produced by the BIOS console in the server 100 or by the remote computer 130 is used to transmit a command from the linked remote computer 130 and the execution results from the BIOS console in the server 100 in response to the command. The data format for each video frame may be in a format from the American National Standards Institute "ANSI") such as the text format of the American Standard Code for Information Interchange ("ASCII"). The ASCII text format is widely used by most industry-standard terminal emulators and many proprietary terminal emulators. The BIOS console in the server 100 and the BIOS console intelligence module can encode each video frame in the ASCII format so that a terminal emulator can transmit the ASCII data characters in each video frame according to their positions in the frame. Hence, although the remote computer 130 and the server 100 may operate based on different computer platforms or different programming languages, they can still use terminal emulators to communicate and interact with each other via the video frames in the ASCII format.

The remote computer 130 can use any terminal emulator to operate the BIOS console in the server 100 if such a terminal emulator is compatible with the ASCII data format. A user at the remote computer 130 can use the keyboard to send a BIOS command in the ASCII data format via the terminal emulator and enter a terminator, e.g., a return key, to indicate an end of a command. The BIOS console in the server 100 can recognize the received data as a command and execute it as such if the command is supported by the BIOS console. A valid BIOS console command may be either an inquiry to a status of the server 100 or a command to set or change a parameter value of the server 100. The execution result may be a replay to the inquiry or the parameter value of a device set by the execution of the user command. When the user command is mistyped or is not supported by the BIOS console, the execution message may be an error message, e.g., a simple text display of "Error".

The BIOS console in the server 100 includes at least a command execution module and a data encoding module. The command execution module has instructions to execute a command received from the remote computer 130. Upon receiving a terminator, the command execution module processes received data in the selected data format as a command. It first compares the received command to a list of predefined BIOS commands in the BIOS console. If there is a match, the matched BIOS command is then executed. If the received command is not a proper BIOS command, the execution is aborted. An error message may be sent to the remote computer 130 to inform the user that the entered command is incorrect. In either situation, the BIOS console in the server 100 needs to communicate the user command and the respective result of the user command to the user at the remote computer 130. The data encoding module is designed to encode data for the user command and the result so that the data can be transmitted to the remote computer 130 in the ASCII data format and be properly decoded and extracted by the BIOS console intelligence module in the remote computer 130 to produce a understandable textual/graphical representation of the user command and its execution result produced by the BIOS console.

Figure 3:
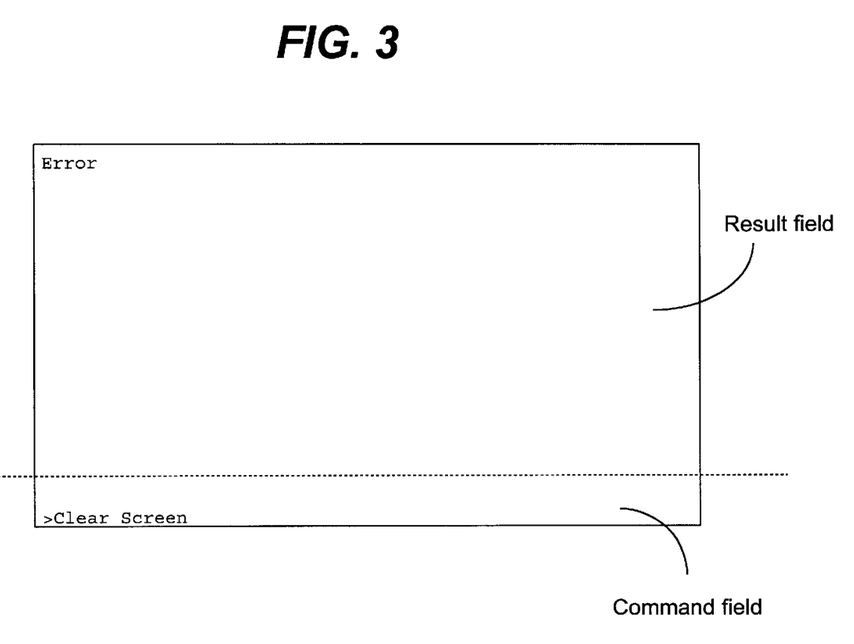
FIG. 3 shows an example of a partitioned video screen having a designated command field and a designated result field.

FIG. 3 shows an example of a video frame which is divided into a command field on the bottom and a result field on the top. A command "Clear Screen" is shown to be entered by the user. An error message "Error" is displayed on the top of the result field because the command does not match any of the supported BIOS commands.

The BIOS console may be designed to display information sequentially from the top of the result field to the bottom within each video frame. For example, in displaying many lines of text, the BIOS console places the first line of the text on the top first line in the result field, the second line of the text on the top second line in the result field, and so on, without scrolling the lines. Hence, when the new line of text is added to the result field, the previous lines of text already displayed do not change their positions on the screen. If the number of lines of text exceeds the maximum allowable display lines in the result field, the BIOS console would display the maximum allowable lines of text first and then ask the user to press a key to refresh the screen with the remaining lines of text in the output.

This non-scrolling mode of display is in a reverse order of many conventional displays where the information scrolls from the bottom of the screen to the top of the screen. In such a scrolling display mode, each time a new line emerges from the bottom line of the screen, other lines already on the screen scroll up. Hence, a new frame of data for the entire screen is needed whenever there is a change in the display. Not so in the above non-scrolling mode. The portion of data for the already displayed lines in the video buffer can remain unchanged. Only the new data for the new text needs to be added to the video buffer. This non-scrolling mode of display can be used to reduce the amount of data to be sent by the BIOS console from the server 100 to the remote computer 130.

In the present implementation, each video frame is represented by data characters in rows and columns since the video frame is the ASCII data format. Each character position is assigned with a coordinate to indicate its row number and column number. Since the command field and the result field are spatially separate, the coordinate value of a data character can identify whether that data character is a data character for a user command or for a result.

Each video RAM in the remote computer 130 and the server 100 has storage cells whose addresses correspond respectively to coordinates of the video frame produced by the BIOS console. One coordinate position in the video frame has a designated cell in each buffer to store a respective data character at that coordinate. Hence, when a video frame is stored in a video RAM, the storage cell addresses of the data for the video frame can be equivalently used as the coordinates. Both the BIOS console in the server 100 and the BIOS intelligence module in the remote computer can distinguish data for a command and the data for the execution result of the command according to their storage cell addresses in a video RAM.

Figure 4:
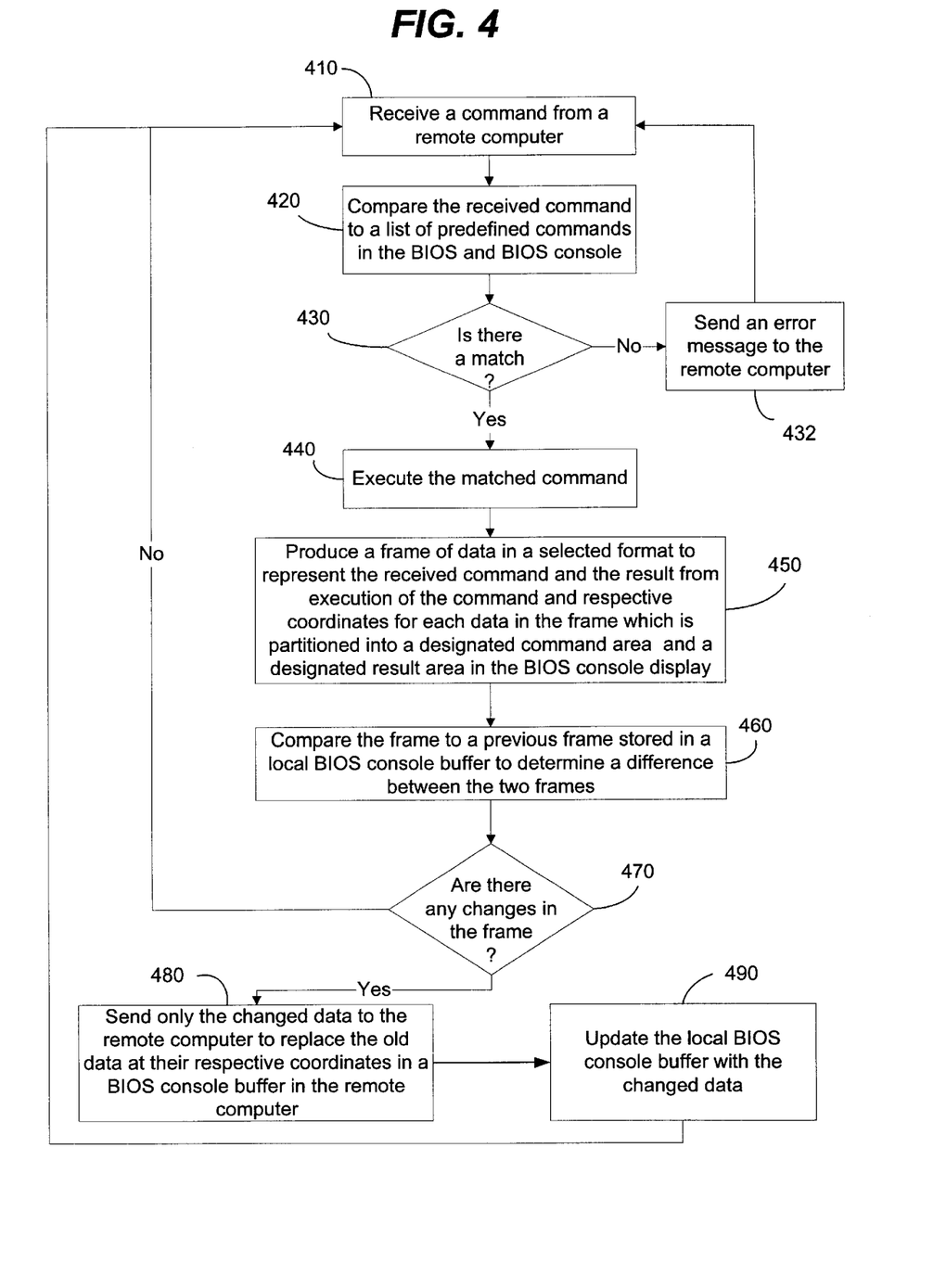
FIG. 4 shows one example of a workflow of the BIOS console.

One function of the data encoding module is to assign each data character a proper coordinate and then put the data character in the ASCII data format. Such data is then sent to the remote computer 130. FIG. 4 shows one exemplary work flow of the execution module and the data encoding module of the BIOS console. Steps 410 through 440 illustrate the operation of the execution module as described above.

The data encoding module is activated after the execution module completes step 440. At step 450, data encoding module produces a frame of data to represent the received command and the execution result. In addition, proper coordinates are assigned to each data character in the frame based on the partition of the video frame into the command field and the result field. At step 460, the data encoding module compares this new frame of data to a previous frame of data to determine the difference between the two frames. This can be done by implementing the aforementioned video sampler circuit 118 in which special instructions are included in the data encoding module to control the video sampler 118. Alternatively, this can be done entirely in software by including a set of instructions to implement a suitable data comparison algorithm.

Next, the data decoding module determines whether there are any changes in the video data. If the two frames are identical, the BIOS console does not send any data to the remote computer 130. If there is a change, then only the changed data characters are sent to the remote computer 130 (step 480). The coordinate information allows the remote computer 130 to replace the old data characters at proper coordinates in its buffer with the newly changed data characters and to display such change to the user. Notice other data characters are not sent by the server 100 since the remote computer 130 already has them. This can reduce the amount of the data to be transmitted to the remote computer 130 and hence increases the operating speed of the BIOS console. This is especially beneficial when the link 120 between the computers 100 and 130 is slow. In addition, the two frame buffers ROMS 109 and 110 maybe updated regardless the output of the step 470.

Figure 5:
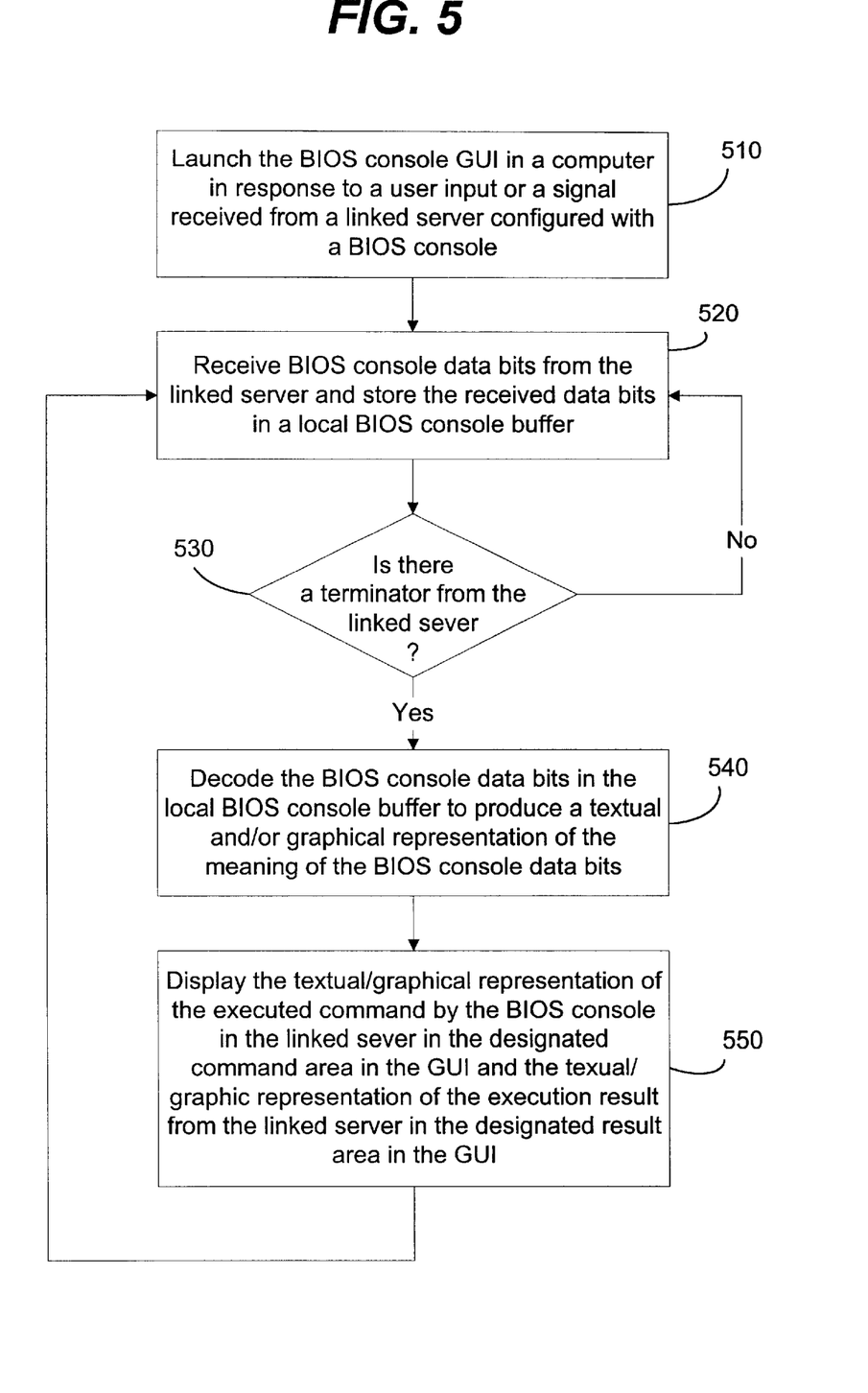
FIG. 5 shows one example of a workflow of a remote computer in interacting with a computer with a BOIS console.

The remote computer 130, upon receiving the data from the server 100, needs to decode and extract the data. This is accomplished by the BIOS console intelligence module installed in the remote computer 130, e.g., in the memory unit 139. FIG. 5 shows how the remote computer 130 interacts with the BIOS console in the server 100.

A BIOS console graphic user interface ("GUI") is implemented in the remote computer 130 to display the information from the server 100. At step 510, the GUI may be launched by an input from the user, e.g., clicking on the. GUI icon, or automatically by the computer 130 in response to the alert signal from the server 100. The link 120 must then be established by connecting the computer 130 to the server 100. The BIOS console in the server 100 may require a valid password to limit the access to an authorized user. After the link 120 is established, a BIOS console display window appears in the GUI to show the output of the BIOS console in the server 100 in the designated result field such as the upper portion of the display and the input commands to the BIOS console in the server 100 from the computer 130 in the designated command field such as the bottom portion of the display.

After step 510, the computer 130 starts receiving data 20 from the BIOS console of the server 100 and storing the received data in the buffer in the RAM 138 (step 520). The received data is not the entire video frame from the BIOS console in the server 100 but rather the changed data bits in the video frame in comparison with a previous video frame already received by the computer 130. The computer 130 continues to do so until a terminator is received to indicate an end of an executed command in the BIOS console of the server 100 (step 530). At step 540, the terminator activates the BIOS console intelligence module to decode the received data in the buffer of the RAM 138.

The BIOS console intelligence module includes decoding instructions based on the encoding algorithm used in the data encoding module of the BIOS console in the server 100. The data for the command sent out from the computer 130 and the data for the output of the BIOS console after the execution of the command can be parsed according to their cell addresses in the buffer. This is because the cell addresses correspond to the coordinate positions in each video frame of the BIOS console. The decoded data can then be converted into an understandable textual or graphical form to the user. Next at step 550, the GUI displays converted textual or graphical data to the user in the BIOS console window on the screen of the remote computer 130.

Figure 6:
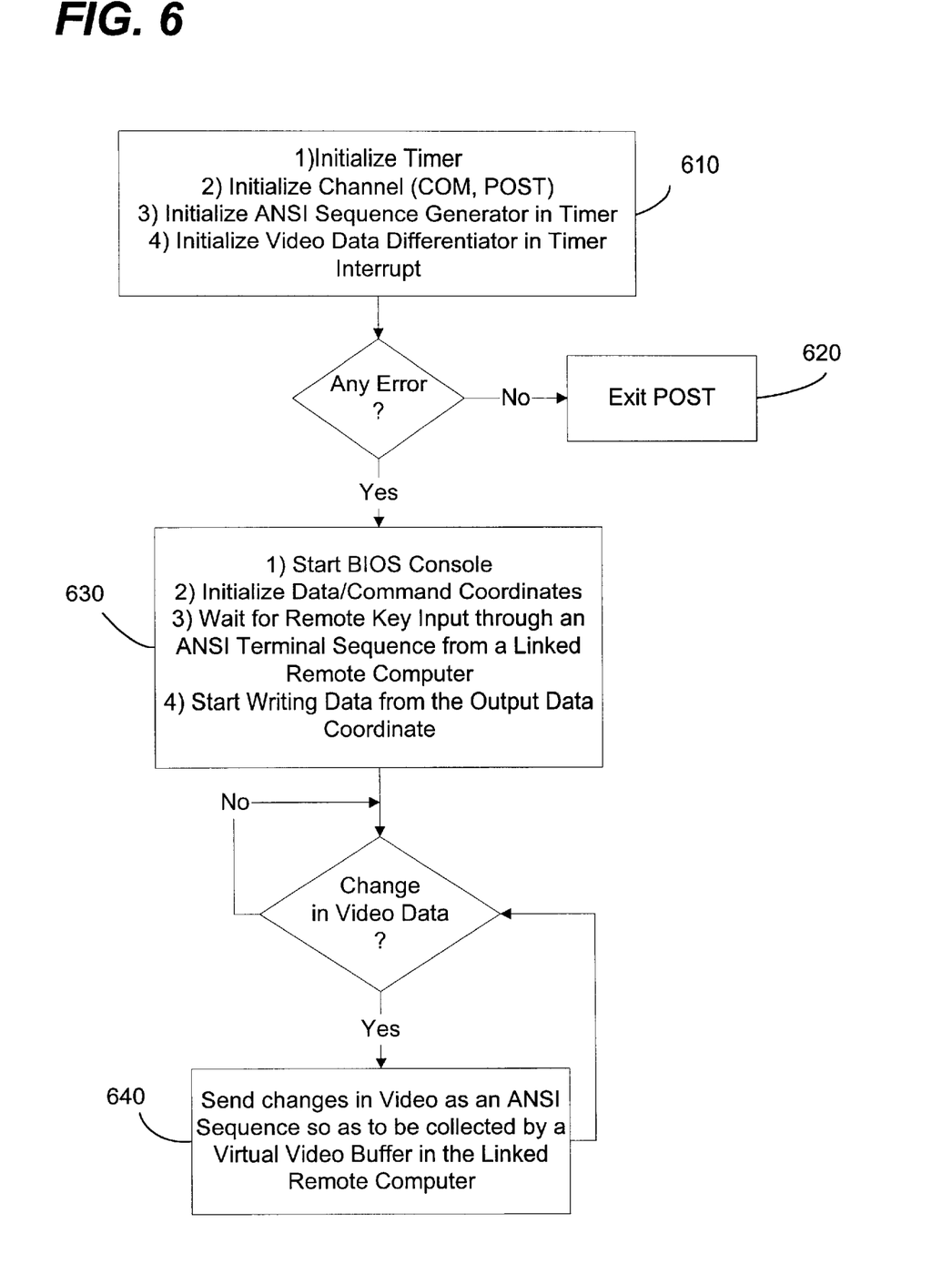
FIG. 6. is a flowchart illustrating one implementation of the BIOS console based on the ASCII data format.

FIG. 6 shows one implementation of the BIOS console based on the ANSI terminal sequence and the embodiment shown in FIG. 4. At step 601, the BIOS console first initializes the communication channel 116, timer interrupt 112, the video sampler 118, and other devices. Then the BIOS console starts the timer that causes the video sampler 118 to sample the video from previous screen data.

If there is no error in POST, the BIOS console instructs the processor 102 to exit the POST and to launch the operating system (step 620). If there is an error, an alert signal is sent out to a user. The user uses the remote computer 130 to link to the server 100 at step 630. The BIOS console in the server 100 then initializes the data and command coordinates and begins sending and receiving data at each timer ISR tick. The video sampler 118 performs the frame comparison and sends the difference data between two timer ticks to the local buffer RAM 109 in the form of ANSI escape sequences. The remote computer 130 updates the data in the virtual screen buffer at the coordinates that are changed from the previous frame. This change is indicated by the ESC sequences in the form of ANSI Terminal data.

The remote computer 130 uses the partitioned video frame to represent the received video data in its buffer where the command and the result from the BIOS console are assigned with fixed command and data coordinates. When a command is to be sent to the BIOS console, the remote computer 130 represents the command in ANSI sequence in the command field of a screen and the sends the screen to the BIOS console. The BIOS console captures that sequence at a timer interrupt and converts that sequence in terms of Keyboard input and releases. Next, that command is automatically represented on Video screen which is then echoed back to the terminal of the remote computer 130 when there is a change in the data (step 640). The remote computer 130 is ready to send another command sequence after it receives a data end sequence which is represented by a special character.

The above BIOS console allows remote control of the computer 100 before the BIOS BOOT from the linked remote computer 130 without loss of data. Since all data is in the ASCII text format, the data can be represented in any language and can be converted to HEX, Binary, or Octal by the BIOS intelligence module in the remote computer 130.

These and other embodiments and variations are intended to be encompassed by the following claims.

What is claimed is:

1. A method, comprising:
    operating a package of instructions in a first computer prior to running an operating system, wherein said package includes a set of instructions within a basic input and output system (BIOS) of said first computer;
    using said package to identify a command according to coordinates of data bits for the said command in said video frame;
    using said package to cause said first computer to execute said identified command from data bits in a video frame received from a second computer via a communication link according to coordinates of data bits for the said command in said video frame;
    using said package of said first computer to generate an output video frame to represent said command and said response in two separate fields having different coordinates;
    sending data for said output video frame to said second computer; and
    extracting said command into the second computer using its local BIOS.

2. A method as in claim 1, further comprising using a terminal emulator data format to send said command from said second computer to said first computer and said data for said video frame from said first computer to said second computer.

3. A method as in claim 2, wherein said terminal emulator data format includes the ASCII format.

4. A method as in claim 1, further comprising:
prior to sending said data for said video frame to said second computer, comparing said data to data for a last video frame generated before said video frame by said first computer to determine whether there is a difference; and
sending each data for said video frame that is changed from a corresponding data bit in said last video frame to said second computer.

5. A method as in claim 4, further comprising using a first buffer to store said video frame and a second buffer to store said last video frame.

6. A method as in claim 5, further comprising using a circuit to sample said first and said second buffers and to perform said comparison.

7. A method as in claim 5, further comprising configuring said package to include instructions that perform said comparison.

8. A computer system, comprising:
a ROM to store a package of executable instructions;
a processor operable to execute instructions in said package to identify to a command in a video frame communicated from a remote computer and execute the command according to coordinates of data bits of the command in the video frame to produce an output when said processor is not running an operating system, said processor operable to produce an output video frame representative of said command and said output in two separate fields;
a first buffer to store data for said output video frame;
a second buffer to store data for another output video frame that is generated sequentially in time after said output video frame;
a video sampler circuit to compare data in said second buffer to data in said first buffer; and
a communication port to send each data in said another output video frame that is changed from said output video frame to the remote computer, wherein, without running said operating system in said processor, said processor instructed by said package is operable to make two separate fields having different coordinates such that data bits representing said command are in a command field and data bits representing a response are in a response field, and said processor is also operable to extract said command from said data bits in said command field for execution according to coordinates of said data bits.

9. A system as in claim 8, wherein said package includes a set of instructions within a basic input and output system (BIOS) of the computer system.

10. A system as in claim 8, wherein said communication port sends data in the ASCII data format.

11. A method, comprising:
operating a basic input and output system (BIOS) in a first computer in absence of a running operating system;
connecting a second computer to said first computer to send a command to said first computer in a video frame in a terminal emulator data format which has a designated command field and a separate designated result field that have different coordinates;
placing data bits representing said command in said designated command field in said video frame;
using said BIOS in said first computer to extract said command from said data bits in said designated command field in said video frame according to coordinates of said data bits;
using said BIOS in said first computer to execute said command to produce a response;
using said BIOS of said first computer to generate a new video frame to represent said command in a designated command field and said response in a separate result field;
sending data for said video frame to said second computer; and
extracting said response from said new video frame in said second computer according to coordinates of data bits for said response in said new video frame.

12. A method as in claims 11, wherein said terminal emulator data format is the ASCII data format.

13. A method as in claim 11, further comprising:
prior to sending said new video frame to said second computer, comparing data in said new video frame to data in a last video frame generated before said new video frame by said first computer to determine whether there is a difference; and
modifying said new video frame to include only each data bit that is changed from a corresponding data bit in said last video frame to produce an output video frame; and
sending said output video frame to said second computer.

14. A method as in claim 13, further comprising using a first buffer to store said new video frame and a second buffer to store said last video frame in said first computer.

15. A method as in claim 13, further comprising using a circuit in said first computer to sample said first and said second buffers and to perform said comparison.

16. A method as in claim 13, further comprising configuring said BIOS in said first computer to perform said comparison.

17. An information processing device comprising a machine-readable storage medium having executable instructions that enable the device prior to running an operating system to:
communicate with a linked computer via a video frame delivered over a communication link, wherein each video frame includes a command field carrying data bits for a command and a response field;
identify a command received in a video frame from the linked computer according to coordinates in the command field;
extract the data bits in the received command in the video frame according to the coordinates;
execute the command received from the linked computer to produce a response;
generate a video frame to represent said command and said response in two separate fields within said video frame; and
send said video frame to the linked computer.

18. A device as in claim 17, wherein said package includes a set of instructions within a basic input and output system (BIOS) of the device.

19. A device as in claim 17, wherein the device is further enabled to compare two sequentially produced video frames to determine a data change and to send only said data change to said another computer.

* * * * *